United States Patent [19]

Daijo

[11] Patent Number: 5,615,102
[45] Date of Patent: Mar. 25, 1997

[54] INVERTER APPARATUS AND METHOD OF OPERATION THEREFOR

[75] Inventor: Masakatsu Daijo, Aichi, Japan

[73] Assignee: Mitsubishi Denki Kabushiki Kaisha, Tokyo, Japan

[21] Appl. No.: 219,462

[22] Filed: Mar. 29, 1994

[30] Foreign Application Priority Data

Mar. 30, 1993 [JP] Japan .................................. 5-071719

[51] Int. Cl.⁶ .................................................. H02M 3/335
[52] U.S. Cl. ............................ 363/132; 363/37; 318/810
[58] Field of Search ............................ 363/98, 37, 132, 363/131; 318/810, 811

[56] References Cited

U.S. PATENT DOCUMENTS

| | | |
|---|---|---|
| 4,291,265 | 9/1981 | Kawada et al. |
| 4,513,362 | 4/1985 | Aizawa. |
| 4,772,996 | 9/1988 | Hanei et al. ............................... 363/41 |
| 4,788,485 | 11/1988 | Kawagishi et al. ...................... 318/811 |
| 5,072,354 | 12/1988 | Katto et al. ................................ 363/41 |

FOREIGN PATENT DOCUMENTS

| | | | |
|---|---|---|---|
| 454461 | 2/1992 | Japan ........................... G01R 21/133 |
| 577-627 | 11/1977 | U.S.S.R. .................................... 363/98 |
| 2190754 | 11/1987 | United Kingdom. | |

*Primary Examiner*—Peter S. Wong
*Assistant Examiner*—Rajnikant B. Patel
*Attorney, Agent, or Firm*—Sughrue, Mion, Zinn, Macpeak & Seas

[57] ABSTRACT

An inverter apparatus for driving a three-phase AC motor, having first and second arms each comprising plural parallel-connected transistors and plural parallel-connected diodes, is protected against overheating by detecting the composite current of the transistors and the composite current of the diodes in one of the first and second arms and determining the larger of the currents. The larger current, offering greater accuracy, is used to control the inverter. The apparatus is operative in either the regenerative or driving mode. Alternatively, a single detector can be used but the signal waves are clamped below a reference wave value.

20 Claims, 11 Drawing Sheets

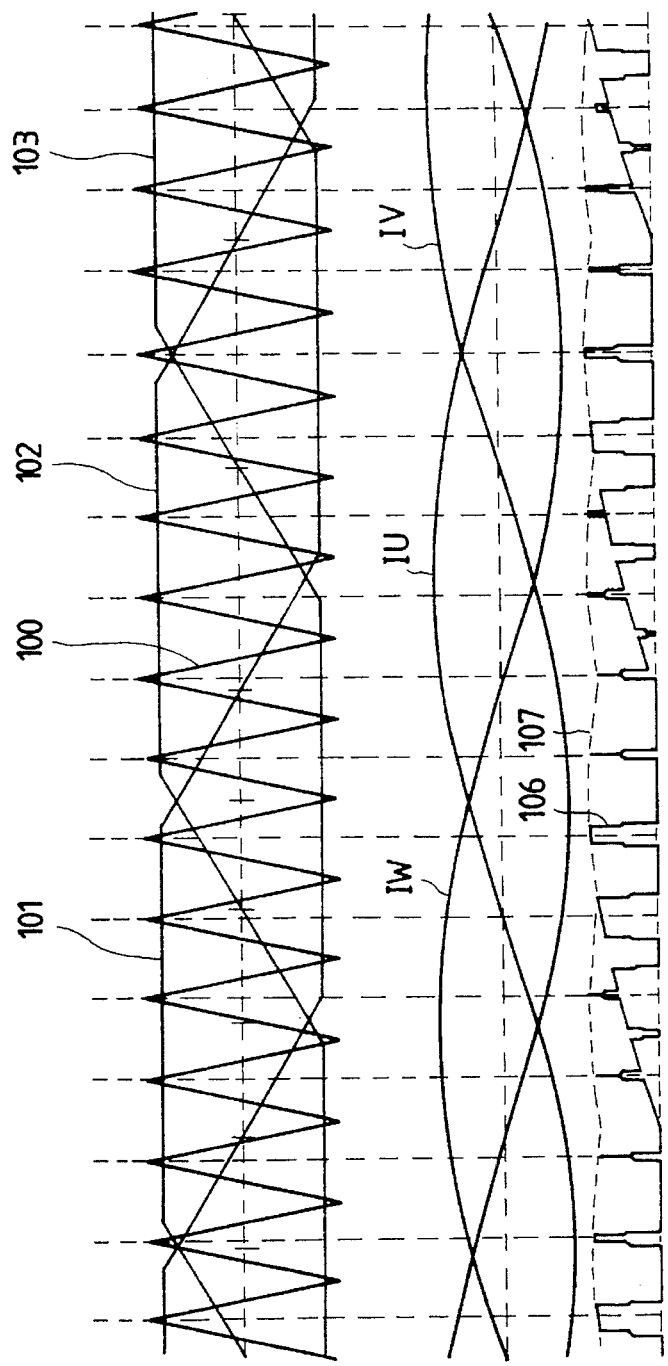

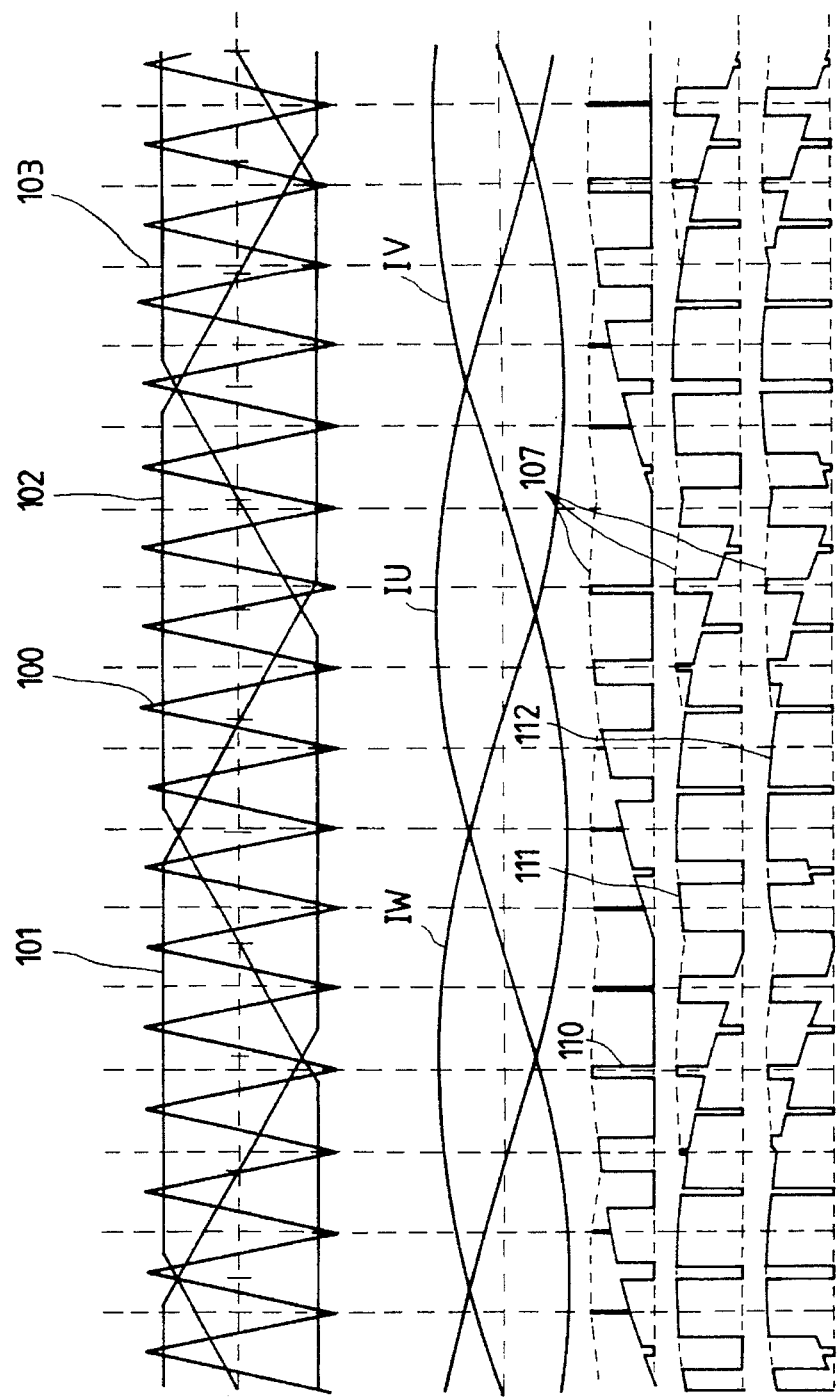

INVERTER APPARATUS AND METHOD OF OPERATION THEREFOR

BACKGROUND OF THE INVENTION

1. Field of the Invention

The present invention relates to a current detection method for a voltage source inverter apparatus such as a PWM (Pulse Width Modulation) inverter which drives a three-phase alternating-current motor.

2. Description of the Background Art

FIG. 7 is a main circuit arrangement diagram of a conventional PWM inverter, showing an example wherein a current detection method for a voltage source inverter apparatus disclosed in, e.g., Japanese Laid-Open Patent Publication No. HEI4-54461, is employed. In this drawing, the numerals 1 to 3 indicate upper transistors, 4 to 6 denotes lower transistors, 11 to 13 designate upper diodes, 14 to 16 represent lower diodes, and the upper transistors 1 to 3 and the upper diodes 11 to 13 are referred to as an upper arm and the lower transistors 4 to 6 and the lower diodes 14 to 16 are referred to as a lower arm. The circuit has connection points, including a U-phase output terminal 21, a V-phase output terminal 22, a W-phase output terminal 23, a first input terminal 24 and a second input terminal 25. In addition, the circuit has a smoothing capacitor 30 and controls an alternating-current motor 31. Finally, 40 designates a current detector which detects the composite current of the lower transistors 4, 5, 6, and 106 represents a detection current detected by the current detector 40.

In the P inverter, one of the upper and lower transistors (for example, the transistor 1 and the transistor 4) is always ON and the other is always OFF. When it is assumed that the direction in which currents IU, IV, IW of the output terminals 21, 22, 23 in the U, V and W phases flow out of the inverter is positive, the sum total of these currents is always zero. When the lower transistor 4 is ON and the current IU is negative, IU flows in the lower transistor 4, but when the current IU is positive, IU flows in the lower diode 14. Accordingly, when it is assumed that the direction of flow from the emitter of the transistor 4 to the capacitor 30 is positive, the detection current 106 detected by the current detector 40 is represented by the following expression:

Detection current 106=−[(a current value when the transistor 4 is ON and IU is negative)+(a current value when the transistor 5 is ON and IV is negative) +(a current value when the transistor 6 is ON and IW is negative)].

A method of controlling an output voltage in the PWM inverter will be described in accordance with FIGS. 8 (a), 8(b) and 8(c) which are timing charts at a time when a voltage control ratio (hereinafter referred to as the "AMP"), as represented by the amplitude of a signal wave/amplitude of a triangular wave, is small. In this drawing, waveform of FIG. 8(a) shows relationships between the modulated amplitude of a triangular wave (hereinafter referred to as the "triangular wave") and the signal amplitude of sine waves (hereinafter referred to as the "signal wave"). Specifically, 100 indicates a triangular wave, 101 represents a signal wave, 102 denotes a signal wave which is identical to the signal wave 101 in amplitude and lags it by a phase angle of 120 degrees, 103 designates a signal wave which is identical to the signal wave 102 in amplitude and lags it by a phase difference of 120 degrees, and 105, 105a and 105b represent positive vertexes of the triangular wave. The waveform of FIG. 8(b) show the output current waveforms of the PWM inverter and the waveforms FIG. 8(c) show a detection current and the output current waveform of the PWM inverter having the highest absolute value, wherein 106 indicates a detection current of the current detector 40, and 107 indicated by a dotted line denotes a waveform having the highest absolute value among IU, IV and IW.

To control the output voltage in the PWM inverter, the triangular wave 100 and the signal wave 101 are compared and the upper transistor 1 is switched ON when the amplitude of the signal wave 101 is larger than that of the triangular wave 100. Reversely, when the amplitude of the signal wave 101 is smaller than that of the triangular wave 100, the lower transistor 4 is switched ON. The signal wave 102 and the triangular wave 100 are compared to control the transistors 2, 5 in the same manner. Also, the signal wave 103 is used to control the transistors 3, 6 in the same manner. By changing the cycles of the signal waves to change the inverter frequency and increase the amplitudes of the signal waves, the output voltage of the inverter can be increased. These signal waves 101, 102, 103 serve as the command values of the phase voltages of the U-phase output terminal 21, the V-phase output terminal 22 and the W-phase output terminal 23 and are equivalent to the fundamental wave components of the phase voltages of the PWM inverter.

When the amplitude of the triangular wave 100 is greater than those of the signal waves 101, 102, 103 as in FIG. 8, the three signal waves 101, 102, 103 and the triangular wave 100 always have points of intersection within one cycle of the triangular wave 100. Hence, the lower transistors 4, 5, 6 are all ON at the positive vertex of the triangular wave 100. For example, at the highest point 105a of the triangular wave 100, IU is negative, IV and IW are positive, and the sum total of the currents IU, IV, IW is zero. Accordingly, the current flowing in the transistor 4 can be detected by the current detector 40 at the highest point 105a of the triangular wave 100. As IU is positive and IV and IW are negative at the other highest point 105b of the triangular wave 100, the current detector 40 detects the current of the sum of IV and IW. This current of the sum of IV and IW is equal to the current IU and flows in the diode 14.

Also, when the AMP is smaller than 1, the output voltage is proportional to the AMP and the alternating-current output voltage effective value of the inverter is represented by approximately AMP*0.612*VDC (V) (here, VDC is a direct-current voltage applied to the terminals 24 and 25).

FIGS. 8(a), 8(b) and 8(c) are timing charts for a regenerative mode wherein energy is returned from the motor 31 in FIG. 7 to the inverter at the voltage control ratio AMP of 0.6 and at the output voltage/output current phase difference of 120 degrees. A direct-current power having polarity as indicated at the capacitor 30 is applied to the terminals 24, 25. At this time, the currents IU, IV, IW are assumed to have a form of sine waves. But even if the current waveforms are distorted, the same results are produced when the sum total of the currents in the three phases is zero and each phase difference between the corresponding currents is 120 degrees.

In any state, as described above, when the triangular wave 100 is larger than the signal waves 101, 102, 103, the maximum current flowing in the transistors or diodes can be detected at the highest point 105 of the triangular wave 100 in the conventional method. Since the sum total of IU, IV, IW is zero, the maximum current flowing in the transistors or diodes can be detected.

However, when the amplitudes of the signal waves 101, 102,103 approach the amplitude of the triangular wave 100, i.e., when the AMP is less than and close to 1, the period when the transistors 4, 5, 6 are ON at the same time may be extremely short. FIGS. 9(a), 9(b), 9(c), 9(d) and 9(e) are timing charts wherein the AMP is large (AMP=0.95). In this drawing, waveform of FIG. 9(a) shows relationships between the triangular wave and the signal waves, wherein 105c indicates the highest point of the triangular wave. Waveform of FIG. 9(b) shows a detection current and the output current waveform of the PWM inverter having the highest absolute value.

With respect to FIGS. 9, the detector 40 detects the current of the sum of IU and IV at point 105c, but since the period when the signal wave 101 exists below the triangular wave 100 is extremely short, the ON period of the lower transistor 4 is extremely short. Hence, the current of the current detector 40 also has a pulse of short width in a region where it matches the maximum value 107 of the phase current, and this cannot be detected practically.

In a conventional inverter, the AMP is often set to not less than 1 to cause voltage saturation in order to provide a large output voltage. In this case, though the output voltage is not proportional to the AMP, the rise in AMP increases the output voltage. FIGS. 10(a), 10(b), 10(c), 10(d) and 10(e) are timing charts at a voltage saturation time (AMP=1.5 and power-factor angle =120 degrees). In this drawing, waveform of FIG. 10(a) shows relationships between the triangular wave and the signal waves, wherein 105d denotes the highest point of the triangular wave 100. Waveform of FIG. 10(b) shows the output current waveforms of the PWM inverter and waveform of FIG. 10(c) shows a detection current and the output current waveform of the PWM inverter having the highest absolute value.

In FIGS. 10, only IU is negative and the signal wave 101 is always above the triangular wave 100 at the point 105d, the signal wave 101 and the triangular wave 100 have no point of intersection near the point 105d, and the transistor 4 is not switched ON at the point 105d, whereby the current waveform 106 of the current detector 40 is zeroed and the phase current of the inverter cannot be detected.

When the AMP is high in the conventional detection method as described above, detection will be inaccurate in a regenerative mode, i.e., when the phase difference between the voltage and the current is more than 90 degrees. Since a certain signal wave 101, 102 or 103 is positive and the highest (and detection time is short) in the regenerative mode, the phase current of the corresponding phase is negative (because the phase difference between the voltage and the current is more than 90 degrees), making detection difficult.

When the AMP is not less than 1, the triangular wave 100 and the signal wave 101,102 or 103 do not have a point of intersection at a position where the signal wave is positive and the highest. At this time, since the phase current value of the corresponding phase is negative in the regenerative mode, correct current detection cannot be performed. This also applies to a case where the sum of the currents of the upper transistors 1, 2, 3 is detected instead of the composite current of the lower transistors 4, 5, 6 which was detected in FIG. 7.

FIG. 11 is a main circuit arrangement diagram of the PWM inverter at a time when the composite current of the upper transistors 1, 2, 3 is detected, wherein 42 indicates a current detector and 10 designates a current waveform of the current detector 42. The detection current 110 detected by the current detector 42 is represented by the following expression:

Detection current 110 = [(a current value when the transistor 1 is ON and IU is positive) + (a current value when the transistor 2 is ON and IV is positive) + (a current value when the transistor 3 is ON and IW is positive).

FIGS. 12(a), 12(b), 12(c), 12(d) and 12(e) are timing charts at a time when the voltage control ratio (AMP=0.95, power-factor angle =120 degrees) is large. Waveform of FIG. 12(a) shows relationships between the triangular wave and the signal waves, wherein 113 and 113a indicate negative vertexes of the triangular wave. Waveform of FIG. 12(b) shows the output current waveforms of the PWM inverter and waveform of FIG. 12(c) shows a detection current and the output current waveform of the PWM inverter having the highest absolute value. In this drawings, the current 110 matches the maximum value 107 of the phase current at the negative vertex 113 of the triangular wave, but the detection current pulse width decreases at a point such as the point 113a and detection is difficult as in the lower transistor current detector 40.

The present invention relates to a method for detecting the maximum value of the phase current of the inverter in either of the driving and regenerative modes.

SUMMARY OF THE INVENTION

An inverter apparatus in accordance with the present invention has a first current detector and second current detector for respective direct-current buses. The first current detector detects the composite current of the main circuit switching devices of an upper circuit arm or a lower circuit arm. The second current detector detects the composite current of diodes connected in parallel to the main circuit switching devices. The inverter apparatus comprises means which selects the larger one of the two detection currents detected. Detection accuracy is accordingly increased.

An inverter apparatus in accordance with the present invention has a DC bus current detection means which detects the composite current of the main circuit switching devices of an upper circuit arm or a lower circuit arm. The detection means comprises means which clamps signal waves below the amplitude of a reference modulated wave. This arrangement provides an accurate detection current near the vertex of the reference wave at a large AMP. A triangular wave is preferred as the reference wave.

An inverter apparatus according to the present invention has a DC bus current detector which detects the composite current of the main circuit switching devices of an upper circuit arm or a lower circuit arm. The detector comprises a means which judges between a driving mode and a regenerative mode and a means which clamps signal waves below the amplitude of a reference modulated wave in the regenerative mode. This arrangement provides an accurate detection current near the vertex of the reference wave at a large AMP. Preferably, the reference wave is a triangular wave.

BRIEF DESCRIPTION OF THE DRAWINGS

FIGS. 4(a), 4(b) and 4(c) are timing charts illustrating a fourth embodiment of the invention.

FIGS. 6(a), 6(b), 6(c), 6(d) and 6(e) are timing charts illustrating waveforms for a preferred embodiment of the present invention.

FIGS. 9(d) and 9(e) show those of the preferred embodiment of the present invention.

FIGS. 10(d) and 10(e) show those of the preferred embodiment of the present invention.

DESCRIPTION OF THE PREFERRED EMBODIMENTS

Figure 1:
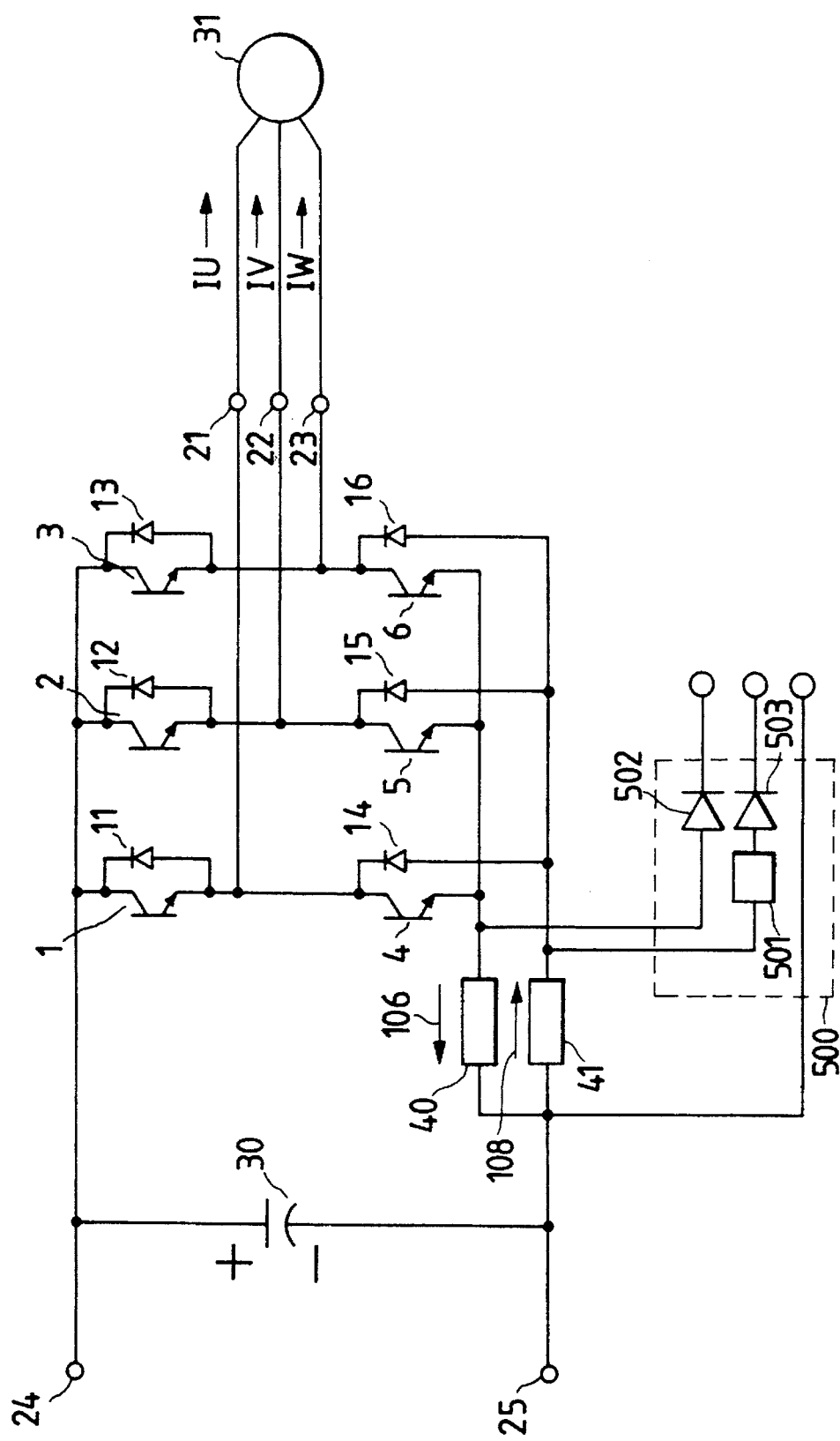
FIG. 1 is a main circuit arrangement diagram of a PWM inverter illustrating a preferred embodiment of the present invention.

FIG. 1 is a main circuit arrangement diagram of a PWM inverter illustrating a first embodiment of the present invention.

Figure 7:
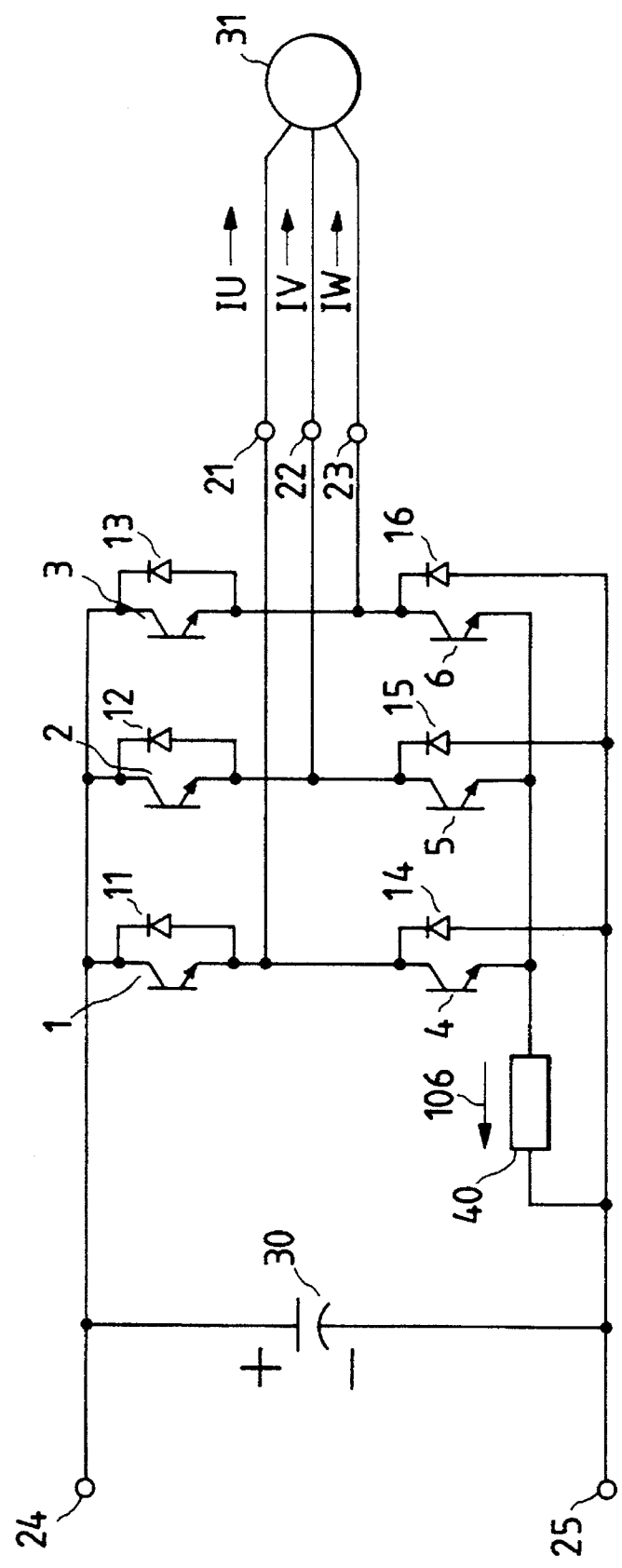
FIG. 7 is a main circuit arrangement diagram of a PWM inverter known in the conventional art.
Figure 8:
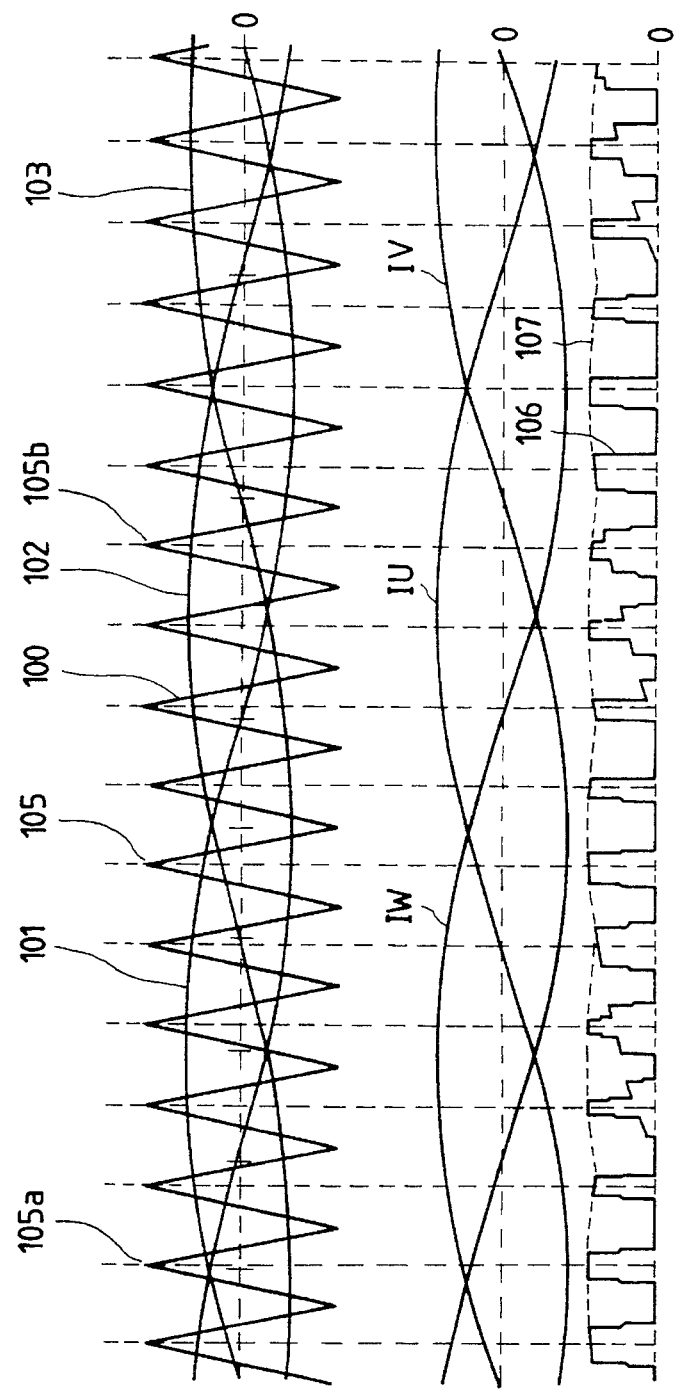
FIGS. 8(a), 8(b) and 8(c) are timing charts where a voltage control ratio is small (AMP=0.6).

As compared to the main circuit arrangement diagram of the conventional PWM inverter which detects the composite current of the lower transistors 4, 5, 6 by means of the current detector 40 shown in FIG. 7, the main circuit arrangement diagram in FIG. 1 has in addition a current detector 41 which detects the composite current of the lower diodes 14, 15, 16 and a detection current selection circuit 500 which fetches the larger current of the detection current 106 and a detection current 108. The detection current 108 flowing in the current detector 41 is represented by the following expression:

Detection current 108 = [(a current value when the transistor 4 is ON and IU is positive) + (a current value when the transistor 5 is ON and IV is positive) + (a current value when the transistor 6 is ON and IW is positive)].

The detection current 108 is different from the detection current 106 of the current detector 40 in that the values of IU, IV and IW detected are positive.

In FIG. 1,500 indicates a detection current selection circuit which detects the larger one of the detection current 106 and the detection current 108, 501 denotes a sign converter which makes the output signal of the current detector 41 positive, and 502 and 503 represent diodes which detect the larger one of said signals. Generally, the current detectors employed in these applications are shunt resistors. In this case, a voltage across each current detector is detected from the terminal 25 in FIG. 1. The current detector 40 and the current detector 41 are opposite in current direction and the output signal of the current detector 40 is positive and that of the current detector 41 is negative. The sign converter 501 makes the output signal of the current detector 41 positive. The diodes 502, 503 detect the larger one of said signals.

Figure 2:
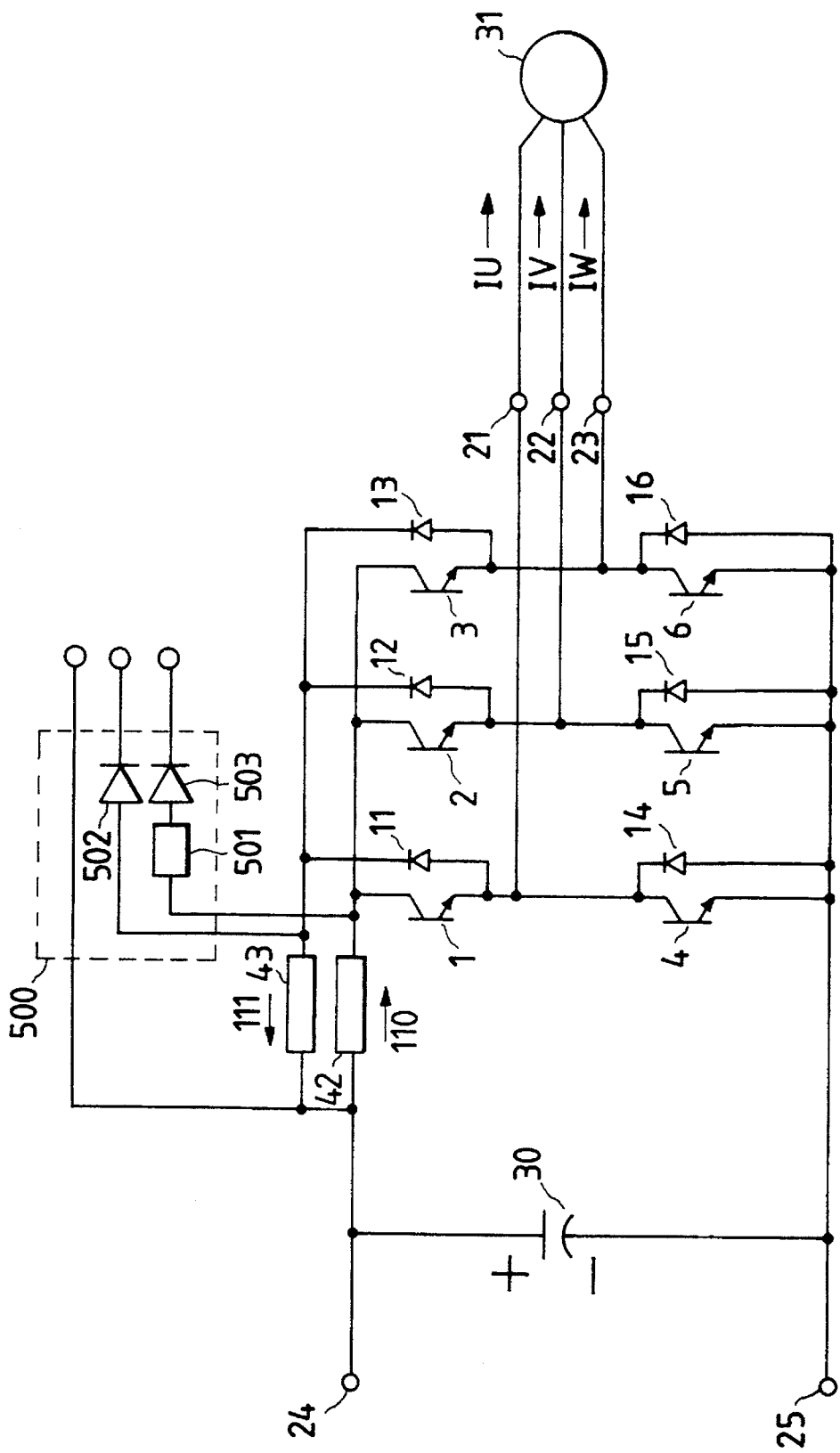
FIG. 2 is a main circuit arrangement diagram of the PWM inverter illustrating a second embodiment of the invention.

The above explanation similarly applies to the relationship between the current detector 42 and the current detector 43 in FIG. 2.

Figure 9:
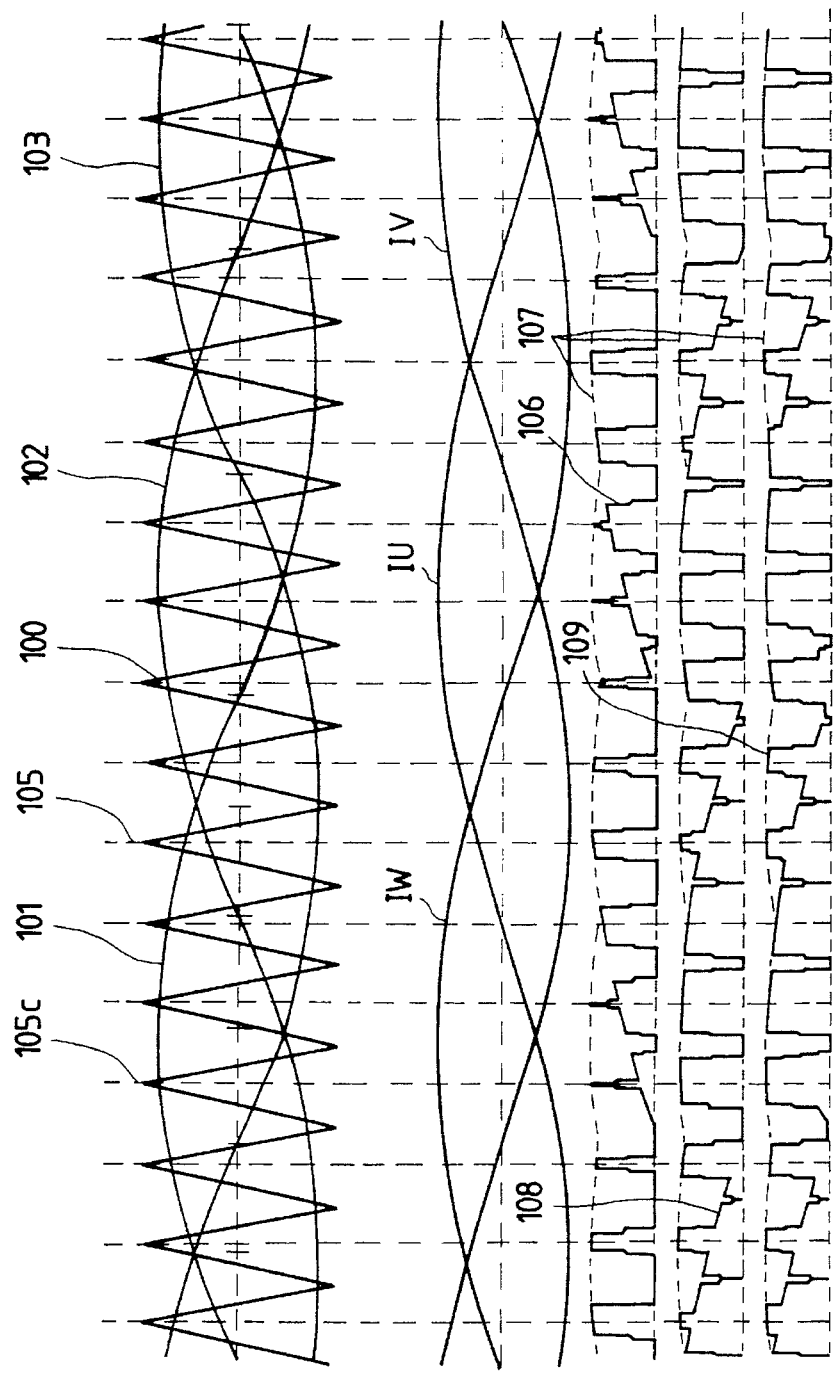
FIGS. 9(a), 9(b), 9(c), 9(d) and 9(e) are timing charts where a voltage control ratio is large (AMP=0.95); waveforms of FIGS. 9(a), 9(b) and 9(c) show the waveforms related to the conventional art and waveforms

Waveform of FIG. 9(d) shows a detection current waveform of the current detector 41 according to the present embodiment and waveform of FIG. 9(e) shows a detection current waveform fetched by the detection current selection circuit 500 according to the present embodiment. In this drawing, 108 indicates the detection current of the current detector 41, 109 designates the larger current waveform of the detection current 106 and the detection current 108 fetched by the detection current selection circuit 500. Since the W-phase current IW is positive near 105c or the vertex of the triangular wave 100 in FIGS. 9, the current detector 41 detects this current. Because this drawing supposes the regenerative mode, the signal wave 103 intersects for a long time at the bottom of the triangular wave and the detection time is also long.

Figure 10:
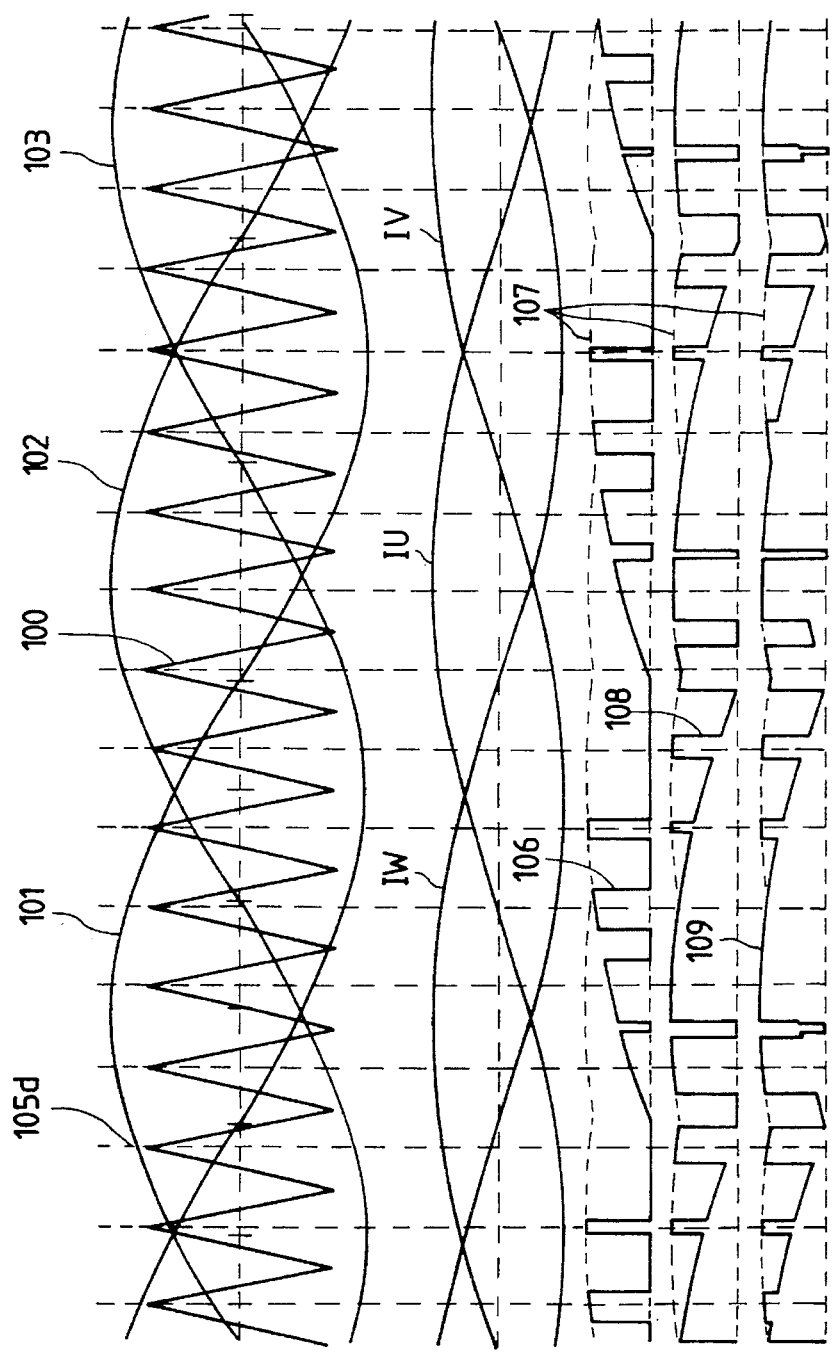
FIGS. 10(a), 10(b), 10(c), 10(d) and 10(e) are timing charts at the time of voltage saturation (AMP=1.5); waveforms of FIGS. 10(a), 10(b) and 10(c) show the waveforms of the conventional art and waveforms

In FIGS. 10 where the amplitude of the command voltage is increased and the AMP is set to not less than 1 to further increase the output voltage, waveforms of FIG. 10(d) shows a detection current waveform of the current detector 41 according to the present embodiment and waveform (e) shows a detection current waveform fetched by the detection current selection circuit 500 according to the present embodiment. In this drawing, 108 indicates a detection current of the current detector 41, 109 designates the larger current waveform of the detection current 106 and the detection current 108 fetched by the detection current selection circuit 500. Near 105d or the vertex of the triangular wave 100 in FIGS. 10, the region where the W-phase current and the V-phase current are positive and the signal wave 103 and the signal wave 102 pass the bottom of the triangular wave 100 is long. In this region, the W-phase lower transistor 6 and the V-phase lower transistor 5 are ON, and the composite current of the W phase and V phase is detected by the current detector 41 at this time. Because the sum total of the phase currents is zero, said composite current is equivalent to the maximum value of the phase current or IU. In this case, therefore, the current 108 of the current detector 41 has a wide pulse and the maximum value of the phase current can be detected accurately. In the driving mode, the detection current 106 of the current detector 40 is an accurate current when the amplitude of the command voltage is increased and the AMP is not less than 1. Hence, the detection of the larger current 109 of the detection current 106 of the current detector 40 and the detection current 108 of the current detector 41 allows the current to be detected accurately in either of the driving and regenerative modes.

FIG. 2 is a main circuit arrangement diagram of a PWM inverter showing a second embodiment of the invention. As compared to the main circuit arrangement diagram of the conventional PWM inverter which detects the composite current of the upper transistors 1, 2, 3 by means of the current detector 42 shown in FIG. 11, the main circuit arrangement diagram in FIG. 2 has in addition a current detector 43 which detects the composite current of the upper diodes 11, 12, 13 and a detection current selection circuit 500 which fetches the larger current of the detection current 110 and a detection current 111. The detection current 111 flowing in the current detector 43 is represented by the following expression:

Detection current 111 = –[(a current value when the transistor 1 is ON and IU is negative) + (a current value when the transistor 1 is ON and IV is negative) + (a current value when the transistor 3 is ON and IW is negative)].

The current detector 43 is different from the current detector 42 in that it detects the negative values of IU, IV and IW.

Figure 3:
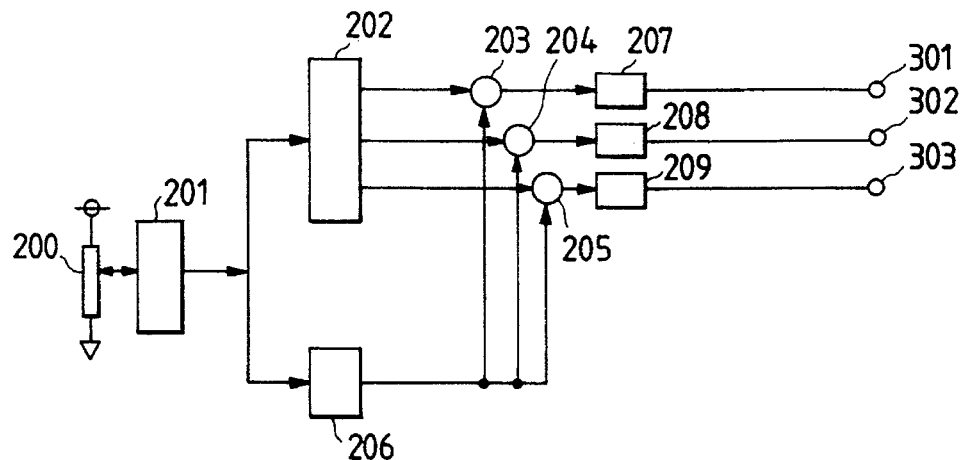
FIG. 3 is a control block diagram employed to make phase voltage commands, illustrating a third embodiment of the invention.
Figures 12A, 12B, 12C, 12D, 12E:
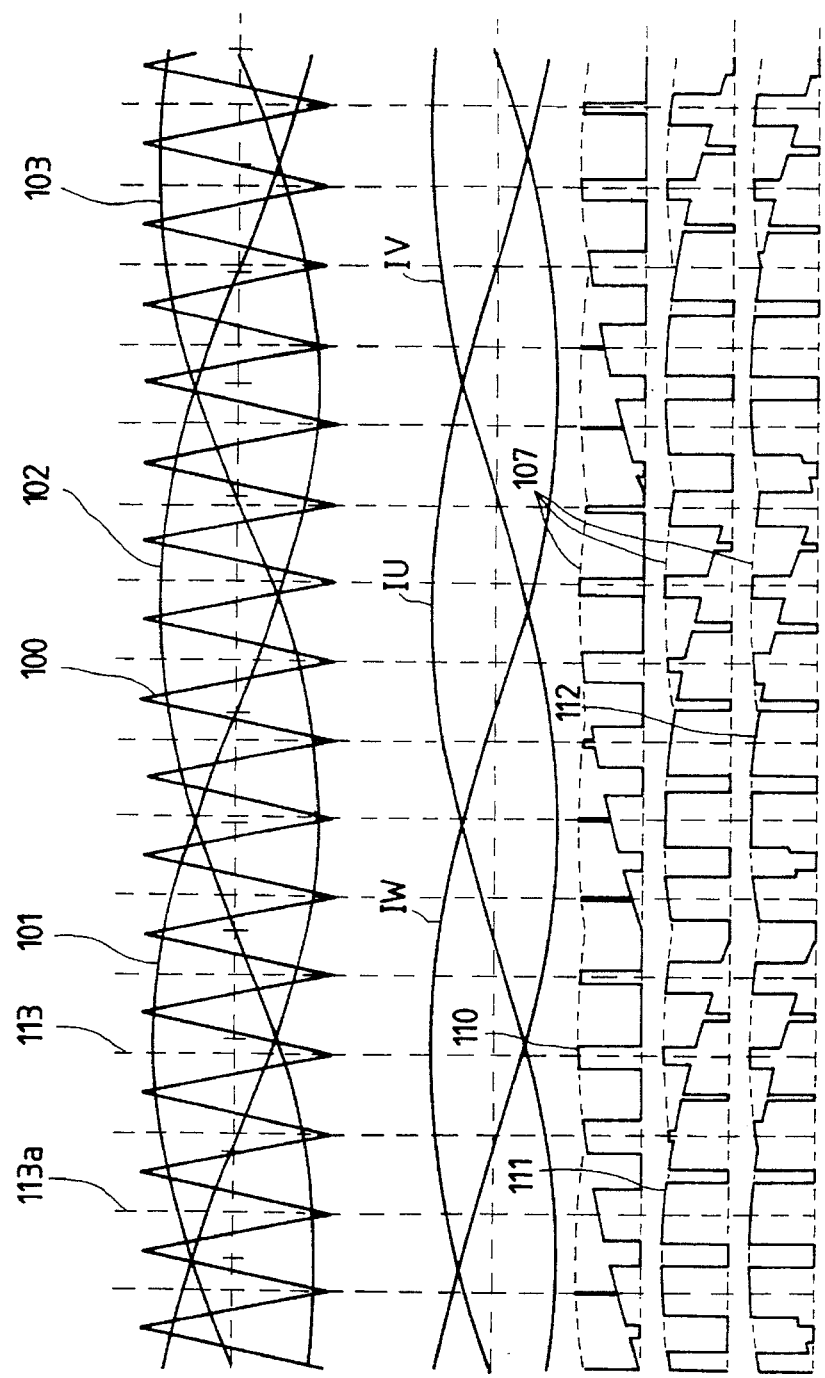
FIGS. 12(a), 12(b), 12(c), 12(d) and 12(e) are timing charts where a voltage control ratio is large (AMP=0.95; waveforms of FIGS. 12(a), 12(b) and 12(c) show the waveforms of the conventional art and waveforms FIGS. 12(d) and 12(e) show those of the preferred embodiment of the present invention.

Waveform of FIG. 12(d) shows a detection current waveform of the current detector 43 according to the present embodiment and waveform of FIG. 12(e) shows a detection current waveform fetched by the detection current selection circuit 500 according to the present embodiment. In this drawing, 111 indicates the detection current of the current detector 43, 112 designates the larger current waveform of the detection current 110 and the detection current 111 fetched by the detection current selection circuit 500. While the current waveform 110 of the current detector 42 has a narrow pulse at a position where it matches the maximum value 107 of the phase current even near 113a or the vertex of the triangular wave 100, the current waveform 111 of the current detector 43 is wide, and the detection of the larger current 112 of the detection current 110 and the detection current 111 allows the current to be detected as in the first embodiment when the AMP is not less than 1. FIGS. 3 and 4 concern a third embodiment of the invention. FIG. 3 is a control block diagram for making phase voltage commands. The detection method in the present invention is identical to the conventional method in FIG. 7 wherein only the current detector 40 is employed, but the signal waves are clamped below the amplitude of the triangular wave to ensure accurate detection of the composite current. In FIG. 3, 200 indicates a speed setting device, 201 denotes a soft start circuit which brings the output gradually closer to the command value under the command of the speed setting device 200. Also, 202 designates a three-phase sine wave generator which outputs a three-phase sine wave having a frequency proportional to the output of the soft start circuit 201, 203, 204 and 205 represent multipliers, and 206 indicates a V/f setting device which determines an applied voltage to the motor according to the output of the soft start circuit 201. Further, 207, 208 and 209 represent clamp circuits which drop the outputs of the multipliers 203, 204, 205 below the amplitude of the triangular wave, and 301, 302 and 303 designate terminals which provide the sine wave command values of the three phases. Here, the output of the V/f setting device is determined such that the motor applied voltage is a predetermined value if the clamp circuit is activated. In FIG. 3, clamping is made at the AMP of 1.5 so that the amplitude does not exceed 90 percent of the triangular wave 100 amplitude in both the positive and negative directions.

FIG. 4 is a timing chart in which the signal waves 101,102, 103 are clamped at 90 percent of the amplitude of the triangular wave 100, wherein waveforms (a) show relationships between the triangular wave and the signal waves, waveforms (b) show the output current waveforms of the PWM inverter, and waveforms (c) show the detection current and the output current waveform of the PWM inverter having the highest absolute value. In this drawing, 106 indicates a detection current of the current detector 40 and 107 shown by a dotted line designates a waveform having the highest absolute value among IU, IV and IW. By clamping the signal waves 101, 102, 103 at 90 percent of the triangular wave 100, the signal waves 101,102,103 are kept smaller than the amplitude of the triangular wave 100, whereby the current can be detected accurately at the positive vertex of the triangular wave.

While the third embodiment is designed to clamp the signal waves below the amplitude of the triangular wave in the main circuit arrangement diagram of the conventional PWM inverter which detects the composite current of the lower transistors 4, 5, 6 by means of the current detector 40 shown in FIG. 7, thereby detecting the composite current accurately, the same effects can be provided for the main circuit arrangement diagram of the conventional PWM inverter which detects the composite current of the upper transistors 1, 2, 3 by means of the current detector 42 shown in FIG. 11. FIGS. 6(a), 6(b), 6(c), 6(d) and 6(e) are timing charts for this case wherein the signal waves 101, 102, 103 are clamped at 90 percent of the amplitude of the triangular wave 100. The detection method in the present invention is identical to the conventional method in FIG. 11 wherein the current detector 42 alone is employed, but the signal waves are clamped below the amplitude of the triangular wave to ensure accurate detection of the composite current. In FIGS. 6, the AMP is defined as 1.5 and the amplitude is clamped so as not to exceed 90 percent of the triangular wave in both the positive and negative directions. By clamping the signal waves 101, 102, 103 at 90 percent of the amplitude of the triangular wave 100 in this way, the signal waves 101,102, 103 are kept smaller than the amplitude of the triangular wave 100, whereby the current can be detected accurately at the negative vertex of the triangular wave.

Figure 5:
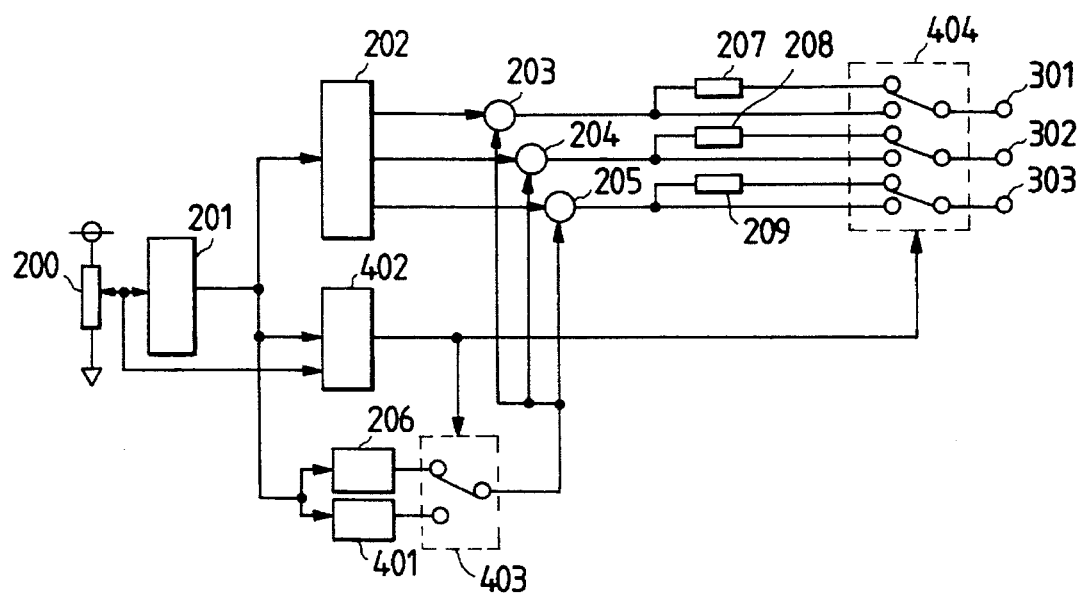
FIG. 5 is a control block diagram employed to make phase voltage commands, illustrating a fifth embodiment of the invention.

FIG. 5 is a control block diagram for making phase voltage commands, representing a fifth embodiment of the invention. Clamping is made only in the regenerative mode and is not performed in the driving mode wherein current detection is made accurately. In this drawing, 401 indicates a V/f setting device preset to output an amplitude larger than the triangular wave when the speed rises, and 402 represents a comparator which compares the outputs of the speed setting device 200 and the soft start circuit 201 to select between the connections with switches 403 and 404 for selection between the driving and regenerative modes. The blocks in FIG. 5 having the same numbers as in FIG. 3 perform the identical operations and will not be described here.

402 indicates a comparator which compares the outputs of the speed setting device 200 and the soft start circuit 201 for connecting switches 403 and 404 opposite to a direction shown in FIG. 5 when the output of the speed setting device 200 is larger than or equal to that of the soft start circuit 201 and for connecting the switches 403 and 404 in the direction shown in FIG. 5 when the output of the speed setting device 200 is smaller than that of the soft start circuit 201.

When the switches 403, 404 are connected opposite to the direction shown in FIG. 5, the motor is in acceleration or in stationary operation, i.e., in the driving mode. In this case, a V/f setting device 401 is set to output an amplitude larger than that of the triangular wave when the speed rises, whereby a high output voltage can be applied to the motor. Also, because of the driving mode, the current can be detected accurately only by the current detector 40. The timing chart in the regenerative mode is identical to the one in FIGS. 4(a), 4(b) and 4(c).

When the switches 403, 404 are connected in the direction shown in FIG. 5, the motor is in deceleration, i.e., in the regenerative mode. In this case, since the V/f setting device 206 and the clamp circuits 207, 208, 209 operate in the same manner as in the third embodiment, the current can also be detected accurately by only the current detector 40 in the regenerative mode.

Figure 11:
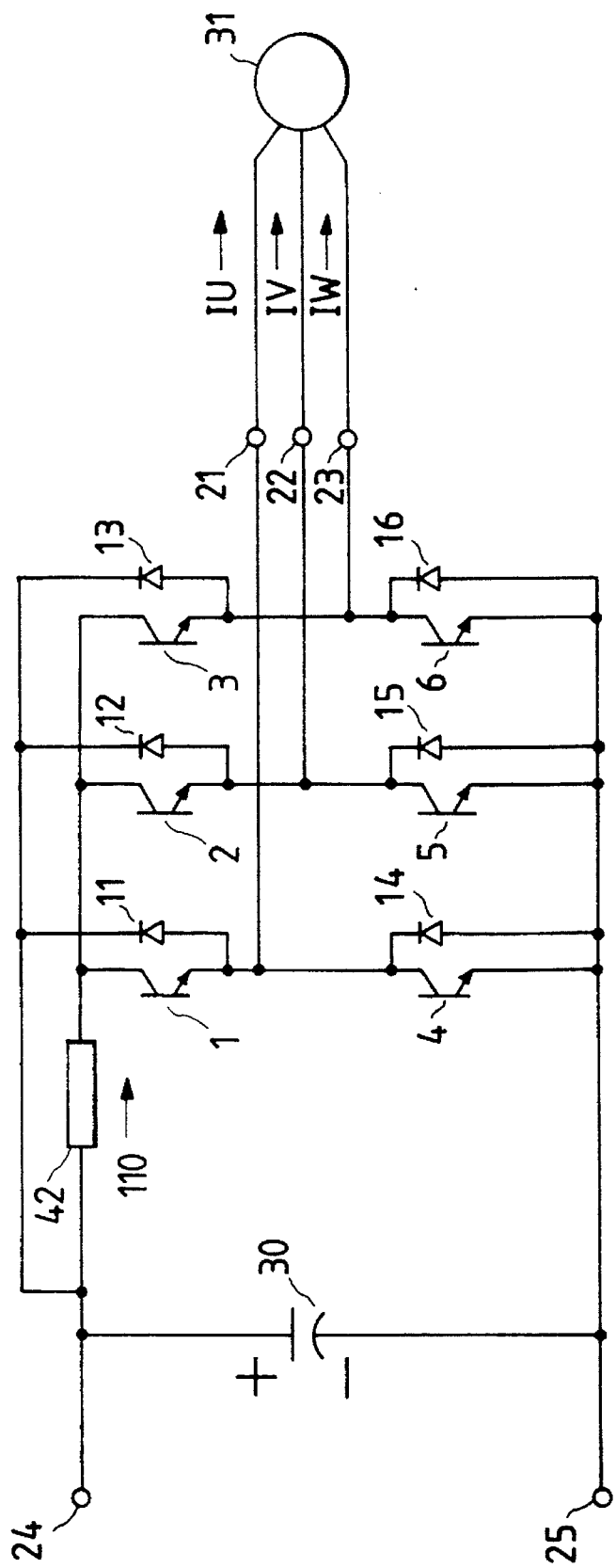
FIG. 11 is a main circuit arrangement diagram of the conventional PWM inverter.

While the fifth embodiment is designed to clamp the signal waves only in the regenerative mode, and not to clamp them in the driving mode so that current detection is made accurately, in the main circuit arrangement diagram of the conventional PWM inverter which detects the composite current of the lower transistors 4, 5, 6 by means of the current detector 40 shown in FIG. 7, the same effects can be provided for the main circuit arrangement diagram of the conventional PWM inverter which detects the composite current of the upper transistors 1, 2, 3 by means of the current detector 42 shown in FIG. 11. In the present invention, the voltage is clamped only in the regenerative mode and is not clamped in the driving mode wherein current detection is made accurately. The control block diagram is identical to the one in FIG. 5 of the fifth embodiment and will not be described. The timing chart in the regenerative mode is identical to the one in FIGS. 6.

It will be apparent that the present invention, as described above, allows a PWM inverter for driving a three-phase alternating-current motor to accurately detect the output currents of the inverter in either of the driving and regenerative modes or even under voltage saturation, thereby accurately providing protection for transistors and diodes in the main circuit from overcurrent and protection against an excessive current flow to the motor.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. An inverter apparatus comprising:
   a first arm, comprising a plurality of transistors parallel-connected to a first direct current bus and a plurality of diodes parallel-connected to a second direct current bus;
   a second arm comprising a plurality of transistors parallel-connected to a third direct current bus and a plurality of diodes parallel-connected to a fourth direct current bus;
   a first current detector operative to detect the current in at least one of said first and third direct current buses;
   a second current detector operative to detect the current in at least one of said second and fourth direct current buses; and
   means connected to said first and second current detectors for selecting the larger one of said two detected currents.

2. The inverter apparatus as set forth in claim 1, wherein each of said detected currents comprises a composite of plural currents from one of said plurality of transistors and said plurality of diodes.

3. The inverter apparatus as set forth in claim 1, wherein said plurality of diodes in at least one of said first and second arms is connected in parallel with said plurality of transistors in said arm.

4. The inverter apparatus as set forth in claim 1, wherein at least one of said first and second current detector comprises a shunt resistor.

5. A method of controlling an inverter apparatus having first and second circuit arms, each comprising a plurality of parallel-connected transistors and a plurality of parallel-connected diodes, comprising:
   detecting the composite output of said parallel connected transistors of one of said first and second arms;
   detecting the composite output of said parallel connected diodes of said one of said first and second arms;
   selecting one of said two detected currents.

6. The method of controlling an inverter apparatus as set forth in claim 5, wherein said selecting step comprises selecting the larger of two detected currents.

7. The method of controlling an inverter apparatus as set forth in claim 5, wherein said selecting step comprises selecting the one of said two detected currents providing the longer detection time.

8. The method of controlling an inverter apparatus as set forth in claim 5, further comprising operating said inverter in a regenerative mode during said detecting steps.

9. The method of controlling an inverter apparatus as set forth in claim 5, further comprising operating said inverter in a driving mode during said detecting steps.

10. An inverter apparatus providing output signal waves and having a DC bus current detection means for detecting the composite current of the main circuit switching devices of an upper arm or a lower arm, said inverter apparatus further comprising:
    means for providing a triangular modulated wave having a peak vertex;
    means for clamping said signal waves below the amplitude of said triangular modulated wave peak vertex.

11. An inverter apparatus having in a DC bus current detection means for detecting the composite current of main circuit switching devices of an upper arm or a lower arm, said inverter apparatus comprising:
    means for judging between a driving mode and a regenerative mode; and
    means for clamping the amplitude of signal waves at values below the amplitude of a reference modulated wave in said regenerative mode.

12. An inverter apparatus as set forth in claim 11, wherein said means for clamping is operative to clamp said signal waves at a specified percentage of said reference modulated wave.

13. An inverter apparatus as set forth in claim 11, wherein said reference wave is a triangular wave.

14. An inverter apparatus as set forth in claim 11, wherein said means for clamping is not operative for a driving mode.

15. A method of operating an inverter apparatus, having main circuit switching devices in each of an upper arm and a lower arm and being operative to generate plural signal waves having plural relative phases, comprising:
    detecting the composite current of said main circuit switching devices of one of said upper arm and lower arm;
    providing a first reference wave having a variable amplitude with time; and
    clamping signal waves below the amplitude of said reference wave.

16. A method of operating an inverter apparatus as set forth in claim 15, wherein said reference wave comprises a triangular modulated wave.

17. A method of operating an inverter apparatus as set forth in claim 16, wherein said clamping is effected only for a regenerative mode of operation.

18. A method of operating an inverter apparatus, having main circuit switching devices in each of an upper arm and a lower arm and being operative to generate plural signal waves having plural relative phases, comprising:

detecting the composite current of said main circuit switching devices of one of said upper arm and lower arm;

providing a first reference wave having a variable amplitude with time;

judging between a driving mode and a regenerative mode; and clamping the amplitude of said signal waves at values below the amplitude of said reference wave when it is judged that there is said regenerative mode.

19. A method of operating an inverter apparatus as set forth in claim 18, wherein said reference wave comprises a triangular modulated wave.

20. A method of operating an inverter apparatus as set forth in claim 19, wherein said judging comprises comparing the output of a speed selector means and a soft start means.

\* \* \* \* \*